United States Patent [19]

Yonezawa et al.

[11] Patent Number: 4,703,408
[45] Date of Patent: Oct. 27, 1987

[54] APPARATUS AND RECORD CARRIER FOR OPTICALLY WRITING INFORMATION

[75] Inventors: Seiji Yonezawa; Yasunori Kanazawa, both of Hachiouji; Toshiaki Tsuyoshi, Kokubunji, all of Japan

[73] Assignees: Hitachi, Ltd., Tokyo; Hitachi Maxell Ltd., Osaka, both of Japan

[21] Appl. No.: 674,672

[22] Filed: Nov. 26, 1984

[30] Foreign Application Priority Data

| Nov. 28, 1983 | [JP] | Japan | 58-222076 |
| Dec. 16, 1983 | [JP] | Japan | 58-236319 |
| Apr. 6, 1984 | [JP] | Japan | 59-67756 |
| Jul. 31, 1984 | [JP] | Japan | 59-158646 |

[51] Int. Cl.$^4$ ............................................. G11B 21/10
[52] U.S. Cl. ................................... 369/44; 369/109; 369/112
[58] Field of Search .................................. 369/44-46, 369/106, 109, 111, 112

[56] References Cited

U.S. PATENT DOCUMENTS

| 4,209,793 | 6/1980 | Ueno | 369/112 X |
| 4,283,777 | 8/1981 | Curry et al. | 369/32 |
| 4,449,212 | 5/1984 | Reno | 369/112 X |
| 4,462,095 | 7/1984 | Chen | 369/46 X |
| 4,488,277 | 12/1984 | McFarlane et al. | 369/106 X |
| 4,504,939 | 3/1985 | Eberly | 369/54 X |
| 4,507,763 | 3/1985 | Kato | 369/44 |
| 4,532,522 | 7/1985 | Tsunoda et al. | 369/46 X |
| 4,577,301 | 3/1986 | Mathews et al. | 369/51 X |

FOREIGN PATENT DOCUMENTS

| 49-60702 | 6/1974 | Japan. | |
| 56-41530 | 4/1981 | Japan | 369/112 |
| 56-30610 | 7/1981 | Japan. | |
| 58-91536 | 5/1983 | Japan. | |

OTHER PUBLICATIONS

Translation of 56-41530, PTO #2720.

Primary Examiner—Aristotelis M. Psitos
Attorney, Agent, or Firm—Antonelli, Terry & Wands

[57] ABSTRACT

A record carrier has a circular disc-shaped substrate on which a recording layer capable of optically writing information therein is disposed, and is so constructed that a plurality of circumferential reference tracks extending in a rotating direction are provided at radial intervals, the reference track being put into an optically detectable structure so as to function as an optical guide for recording information between the adjacent reference tracks. A first light beam and a second light beam are condensed by an identical objective lens so as to be respectively focused on the recording layer of the record carrier. As one of the reference tracks is being tracked by the first light beam, the second light beam is diffracted by a light diffracter so as to be spaced from the first light beam on the record carrier by desired track pitches in the radial direction thereof. Thus, data is sequentially recorded at predetermined pitches in a recording area located between the reference tracks by means of the second light beam.

20 Claims, 17 Drawing Figures

FIG. 2
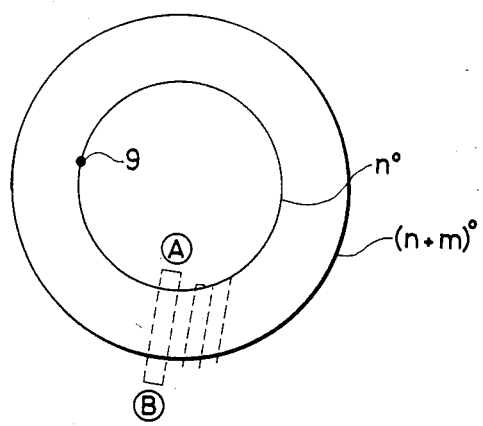
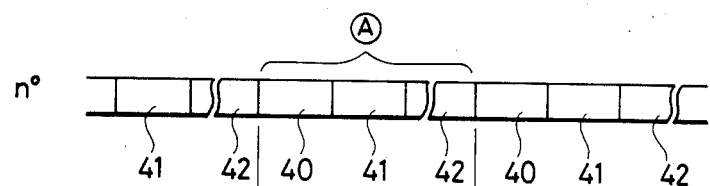
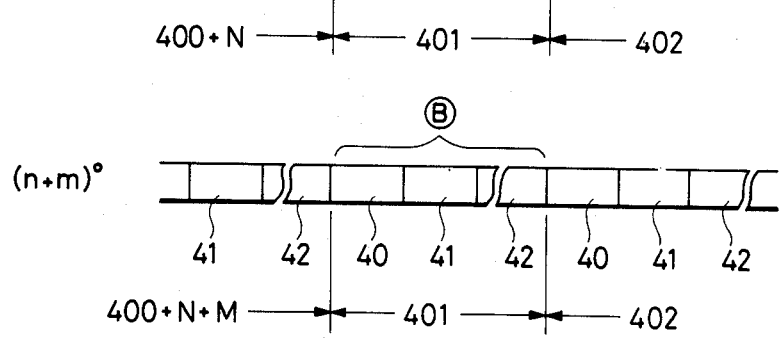

APPARATUS AND RECORD CARRIER FOR OPTICALLY WRITING INFORMATION

BACKGROUND OF THE INVENTION

The present invention relates to disc-shaped record carriers (optical discs) capable of optically recording and/or playing back information such as, for example, an optical data file, an optical video disc and an optical audio disc. More particularly, it relates to an optical disc which has a plurality of reference guide tracks recorded in advance and in which information can be recorded between the reference guide tracks.

Also, the present invention relates to an apparatus for recording information on the optical disc.

As an optical disc capable of recording and playback, there has heretofore been known one in which a recording film provided on a substrate is formed with minute pits by heating and vaporizing very small parts by means of a laser beam. In the recording of the optical disc of this type, when add-on recording is desired, it needs to be performed while a spacing from a track already recorded is held exactly constant. In particular, there is a case where the disc is once taken off after several tracks have been recorded on a part of the disc and where the add-on recording is to be performed anew. In this case, the eccentric magnitude of the disc is usually as large as 100 μm, and the track pitch is about 1.6 μm. Therefore, a track add-on recorded anew crosses several tens of tracks already recorded, and accurate recording becomes impossible.

In order to cope with this situation, an optical disc has been proposed on which an optically detectable guide groove is previously formed so as to record and play back information along the guide groove. Refer to, for example, Japanese Laid-open patent application No. 58-91536 (corresponding to U.S. Ser. No. 443,399). As to the optical disc of this type, a severe dimensional accuracy of the guide groove is required in order to secure the signal-to-noise ratio of a playback signal at a predetermined value.

There has also been proposed an apparatus which forms two laser beams and performs add-on writing by employing one of the laser beams for the tracking (playback) of recording tracks already bearing information (already recorded tracks) and the other for the recording. With this system, since the two laser beams are focused on a record carrier via individual optical systems, two beam spots are very difficult of stably holding a fixed distance on the record carrier, and the distance between them fluctuates due to any slight positional deviation of the individual optical systems. It is, in effect, impossible to measure the distance between both the beam spots, and even the overlap of the two can occur due to a fluctuation in a track interval.

SUMMARY OF THE INVENTION

In view of such drawbacks, the present invention provides a record carrier and an apparatus which can successively write data into tracks while track intervals are held exactly constant by eliminating the influences of an eccentric magnitude etc.

In order to accomplish such object, according to the present invention, a first light beam and a second light beam are caused to enter an identical focusing objective lens and are controlled so that two beam spots may be spaced integral times as large as a desired track interval on a disc and in the radial direction of the disc, the first light beam spot is used for tracking previously recorded reference guide tracks so as to lie at the central positions thereof, and as the first light beam is tracking the reference guide tracks, the second light beam is diffracted by a light diffracter so as to sequentially record data at predetermined pitches.

BRIEF DESCRIPTION OF THE DRAWINGS

FIG. 2 is a view showing another example of the record carrier according to the present invention;

DESCRIPTION OF THE PREFERRED EMBODIMENT

Figure 1:
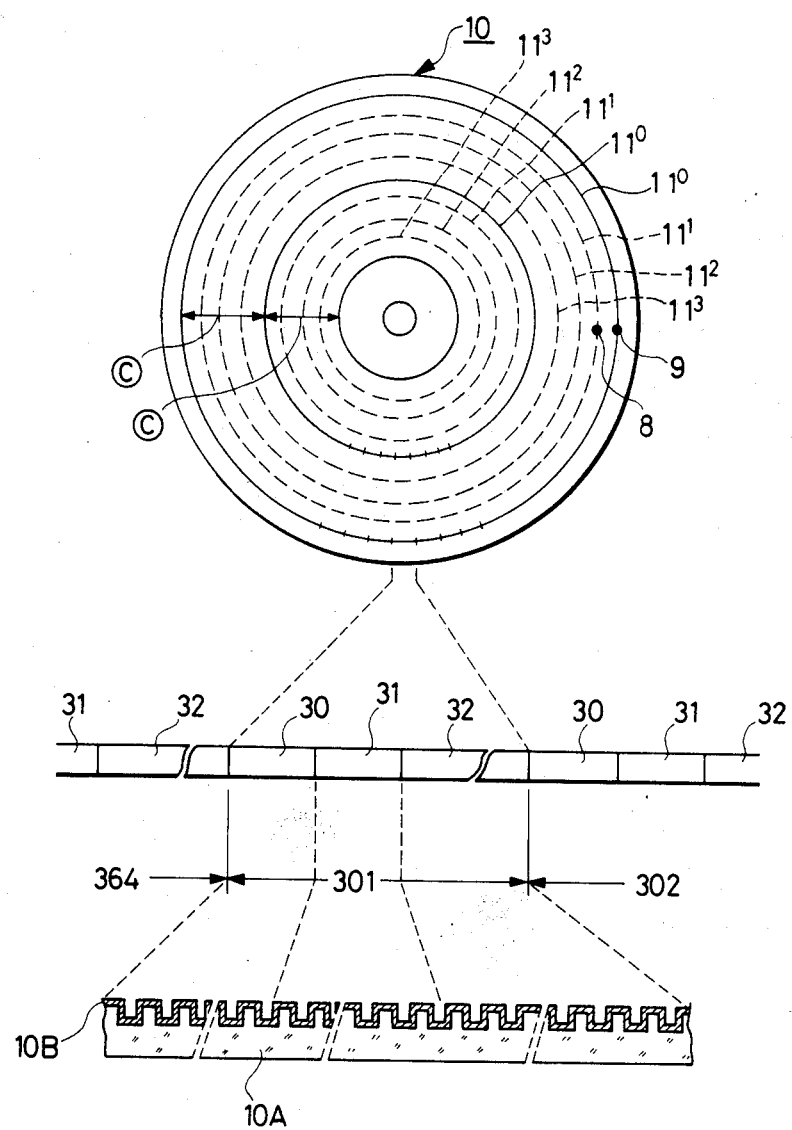
FIG. 1 is a view showing an example of a record carrier according to the present invention.

FIG. 1 is a plan view showing an example of a record carrier 10 for use in the present invention. It also shows a preferable example of reference guide tracks $11^0$ and the sectional structure of the record carrier. The upper surface of this record carrier is formed with the concentric reference guide tracks $11^0$ in large numbers at predetermined intervals in the radial direction thereof. Data items to be written by a user are recorded on tracks $11^1$, $11^2$, ... within recording areas ⓒ indicated by arrows between the reference guide tracks $11^0$, while holding fixed track pitches relative to the reference guide tracks at all times. For the sake of brevity, two of the reference guide tracks are exaggeratedly shown in FIG. 1. In actuality, the reference guide tracks are provided in a number of about 1500 at intervals of 48 μm in a region from an inside radius of 7 cm to an outside radius of 14 cm by way of example (assuming the pitches of the data recording tracks $11^1$, $11^2$, . . . to be 1.6 μm, data corresponding to 29 revolutions can be recorded in each interspace between the reference guide tracks). The number of tracks which can be added-on for one reference guide track $11^0$ is determined by the performance of a light diffracter which is used in a recording/playback apparatus. For example, in case of using an acousto-optic diffracter, up to about 100 tracks can be readily recorded subject to the track pitches being 1.6 μm. In addition, although the data recording tracks $11^1$, $11^2$, . . . have been exemplified as concentric circles in FIG. 1, it is to be understood that they may well be recorded spirally.

In the present invention, each reference guide track $11^0$ is divided into a large number of (e. g., 64) sectors 301, 302, . . . and 364. Each of the sectors 301, 302, . . . and 364 has an address portion 30 in which an address for identifying the reference guide track is recorded, a sector address portion 31 in which an address for appointing the corresponding sector is recorded, and a synchronous portion 32 in which synchronizing signals to be used for recording information on the tracks $11^1$, $11^2$, . . . are recorded. The reference guide track $11^0$ is used as optical guide when recording information on and/or playing it back from the tracks $11^1$, $11^2$, . . . , so that it needs to be optically detectable. The recording area ⓒ is provided with a recording layer of a material which gives rise to an optically detectable change when irradiated with a light beam (for example, laser beam). By way of example, the reference guide track $11^0$ is constructed of an array of minute pits formed in the substrate 10A of the record carrier, and the whole front surface of the record carrier can be coated with a recording layer 10B of a highly reflective material whose reflection coefficient can be controlled by irradiation with a light beam. Effectively used as the recording layer 10B is, for example, a metal layer (such as of Te-Se) which is melted when locally irradiated with a laser beam of high intensity, an amorphous layer (such as of $TeO_x$) for which the phase change between an amorphous body and a crystal is utilized, or an opto-magnetic recording layer (such as of TbFeCo) in which data is recorded by inverting the sense of magnetism under irradiation of a laser beam. The recording layer 10B is disposed on the transparent substrate 10A which is made of, for example, plastic or glass. In this case, the record carrier obtained is such that the reference guide tracks have the address information and the synchronizing signals recorded in phase structures, which are different from the recording form of the information to be recorded by the user. Each address portion 30 or each sector address portion 31 is constructed of a plurality of pits of variable lengths or equal dimensions which are formed in the substrate. The pits of variable lengths denote address information subjected to pulse width modulation, while the pits of equal dimensions denote digital address information encoded. The synchronous portion 32 is constructed of pits in a fixed sequence. During the scanning of a light spot, the array of these pits generates fixed clock signals, on the basis of which information is recorded on or played back from the tracks $11^1$, $11^2$, . . . When the light spot impinges on the pit, reflected light which differs in intensity from that arising upon the impingement of the light spot on the interspace between the pits is obtained from the reference guide track $11^0$ as described above. Thus, the address information and the synchronizing signals recorded on the reference guide track can be detected, while at the same time, information for the tracking of the light spot (a tracking signal which indicates the direction and magnitude of the deviation of the light spot relative to the center of the reference guide track) can be detected.

A record carrier is prepared wherein the whole front surface of a flat substrate is coated with, for example, a highly reflective recording layer whose reflection coefficient can be controlled by a light beam, and a large number of reference guide tracks $11^0$ are formed as concentric circles at predetermined intervals before the user writes data. In this case, in the record carrier obtained, the information items of the reference guide tracks are recorded in the same form as that of the information to be recorded by the user. By way of example, the record carrier of the present invention may be provided with one reference guide track for 30 recording tracks. As regards a disc 30 cm in diameter and 1800 r. p. m. in speed, accordingly, the period of time for initialization having heretofore been 30 minutes decreases to 1/30 and becomes approximately 1 minute in accordance with the present invention.

Next, there will be described a record carrier which can record data with the recording pit length set at a fixed value irrespective of the position of the recording radius r. Referring to FIG. 2, a reference guide track $n^0$ consists of N sectors 401, 402, . . . and 400+N which are obtained by dividing the reference guide track every fixed length. It is the same as in the embodiment of FIG. 1 that each sector has an address portion 40 in which an address for identifying the reference guide track $n^0$ is recorded, a sector address portion 41 in which an address for appointing the corresponding sector is recorded, and a synchronous portion 42 in which synchronizing signals to be used for recording information in the recording area between the reference guide tracks are recorded, and that the reference guide track is constructed so as to function as the optical guide of a light spot during the scanning of the light spot. The number of sectors on each entire track is proportional to the circumference thereof, and is discontinuously increased from the inner periphery toward the outer periphery of the record carrier. More specifically, a reference track $(n+m)^0$ is the m-th reference track as reckoned from the reference track $n^0$, and in contrast to the sector number N of the reference track $n^0$, the sector number of the reference track $(n+m)^0$ becomes N+M.

$$N = 2\pi \cdot r_n / A \qquad (1)$$

$$N + M = 2\pi \cdot r_{n+m} / A \qquad \ldots (2)$$

where N denotes the number of sectors of the reference track $n^0$, N+M the number of sectors of the reference track $(n+m)^0$, A a sector interval (constant), $r_n$ the radius of the reference track $n^0$, and $r_{n+m}$ the radius of the reference track $(n+m)^0$. Assuming $r_n = 70$ mm and N=64 sectors by way of example, Eq. (1) gives:

$$A = 2\pi \cdot r_n / N \qquad \ldots (3)$$

Here will be evaluated the number of sectors N+M at $r_{n+m} = 140$ mm. From Eqs. (2) and (3), $$N + M = 2\pi \cdot r_{n+m} / (2\pi \cdot r_n / N)$$

$$= (r_{n+m}/r_n) \cdot N$$
$$= 2N$$
$$\therefore M = 2N - N = 64$$

Thus, the number of sectors becomes 128, and the memory capacity of the track of $r_{n+m} = 140$ mm is larger by 64 sectors as compared with that of the track of $r_n = 70$ mm. That is, in the information recording tracks $(n+m)^1$, $(n+m)^2$, $(n+m)^3$, ... and $(n+m)^{K-1}$ of the reference track $(n+m)^0$, the memory capacity increases by M sectors per track more than in the information recording tracks $n^1$, $n^2$, $n^3$, ..... and $n^{K-1}$ of the reference track $n^0$. Here, $K-1$ denotes the number of the information recording tracks which exist between the reference tracks. Thus, the number of sectors discontinuously increases every K-th track from the inner periphery toward the outer periphery of the disc. Pits to be written in the reference track are written at a fixed density irrespective of the inner and outer peripheries of the disc beforehand, whereupon in recording or playing back data, the synchronizing signals 42 written on the reference track are detected, and the rotation of the disc is controlled so as to synchronize the phases of the detected signals and the internal reference signals of a recording/playback apparatus. In the above way, information can be recorded from the tracks $n^1$, $n^2$, $n^3$, ... and $n^{K-1}$ to the tracks $(n+m)^1$, $(n+m)^2$, $(n+m)^3$, ... and $(n+m)^{K-1}$ on the basis of the synchronizing signals. According to such record carrier, the use of the reference guide tracks for recording data with the number of sectors discontinuously increased from the inner periphery toward the outer periphery makes it possible to reliably perform add-on recording of higher density.

In order to record information on or play it back from the record carrier of the construction as shown in FIG. 1 or FIG. 2, a recording/playback apparatus is required in which the two sorts of light beams of a tracking light beam for precisely controlling the position of the data track along the reference guide track and a light beam for writing and reading data can be simultaneously emitted in a predetermined positional relationship.

Figure 3:
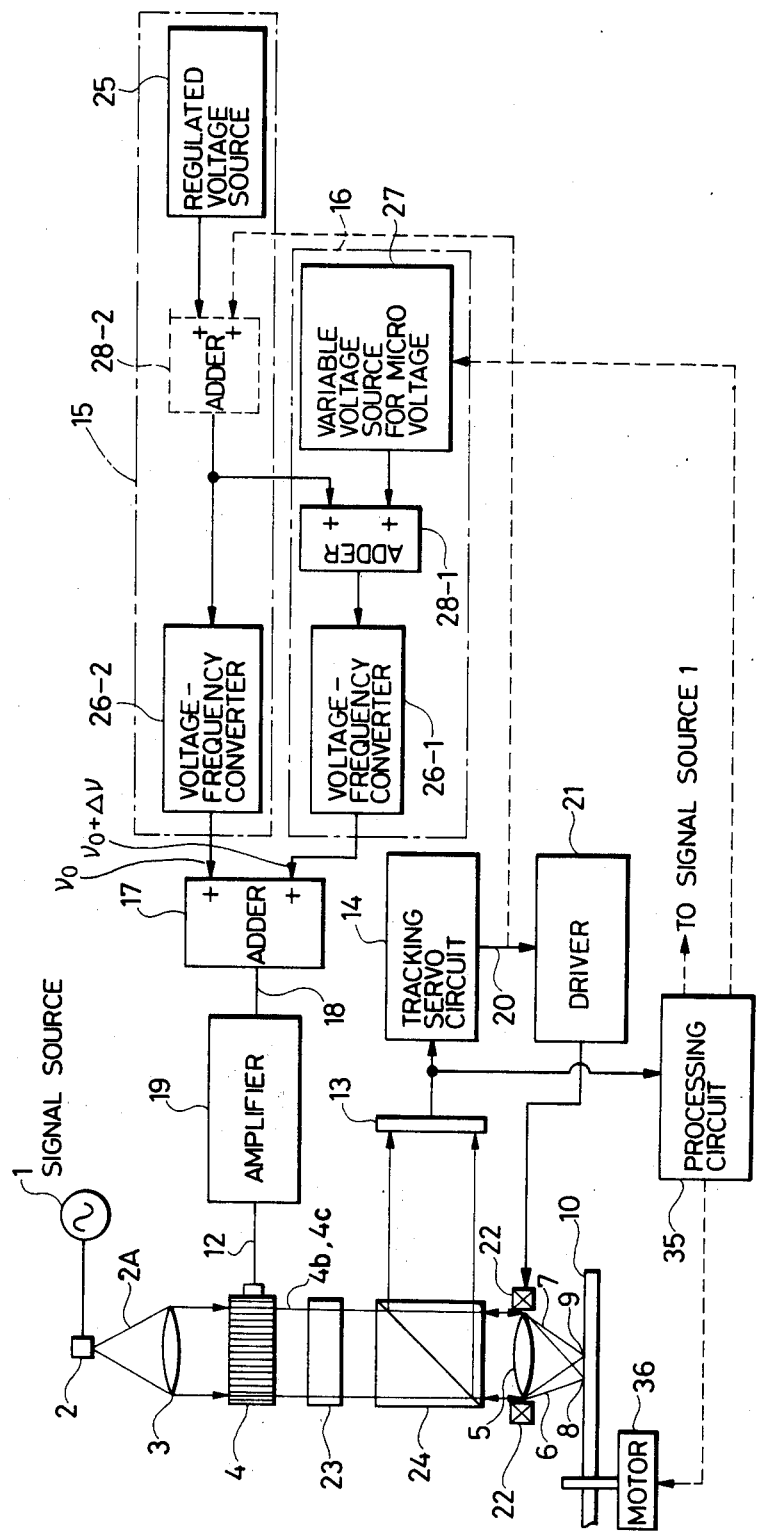
FIG. 3 is a block diagram showing an example of a recording/playback apparatus according to the present invention.
Figure 4:
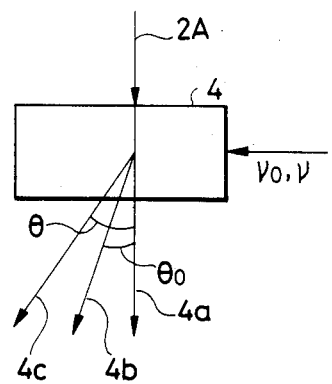
FIG. 4 is a diagram for explaining the operation of a light diffracter which is used in the example of FIG. 3.

FIG. 3 is a diagram showing an embodiment of such information recording/playback apparatus. Referring to the figure, a light source 2 is modulated by a signal source 1, and the modulated light beam 2A thereof is supplied to an optical system. A semiconductor laser, for example, is used as the light source. A coupling lens 3 converts the modulated light beam 2A into a parallel beam, which enters a light diffracter 4. An acoustooptic diffracter (A/O light diffracter), for example, can be used as the light diffracter 4. As illustrated in FIG. 4, two sorts of ultrasonic waves at frequencies $\nu_o$ and $\nu(=\nu_o+\Delta\nu)$ are applied to this A/O light diffracter. In consequence, the incident light beam 2A is split into two sorts of diffracted light; a first light beam 4b inclining by an angle $\theta_o$ or so with respect to zero-order light 4a, and a second light beam 4c inclining by an angle $\theta(=\theta_o+\Delta\theta)$ or so. The second light beam 4c and the first light beam 4b are respectively turned into convergent beams 6 and 7 via a beam transform optical system 23 as well as an objective lens 5, to form minute light spots 8 and 9 on the surface of a disc 10. The objective lens 5 is mounted on an actuator 22 adapted to move in two dimensions, in order to form the minute light spots on the surface of the disc and to bring the light spots to the middle positions of tracks. The convergent beam 6 is the light beam based on the variable frequency $(=\nu_o+\Delta\nu)$ as generated by the light diffracter 4, and the light spot 8 is the light spot of the light beam 6 based on the variable frequency. The convergent beam 7 is the light beam based on the base frequency $\nu_o$ as generated by the light diffracter 4, and the spot 9 is the light spot based on the base frequency.

Next, there will be explained a method according to which, while holding their spacings from the reference guide tracks $11^0$ or $n^0$ exactly constant as illustrated in FIG. 1, the light spots 8 and 9 sequentially record the data tracks $11^1$, $11^2$, $11^3$, $11^4$, ... at equal pitches anew.

The output signals of a base frequency oscillator 15 and a variable frequency oscillator 16 are added by an adder 17, and the added signal 18 is amplified by an amplifier 19. The amplified signal 12 is applied to the light diffracter 4. The base frequency oscillator 15 is composed of a regulated voltage source 25 and a voltage-frequency converter 26-2. The variable frequency oscillator 16 is composed of a variable micro voltage source 27, an adder 28-1 and a voltage-frequency converter 26-1.

Figure 5A:
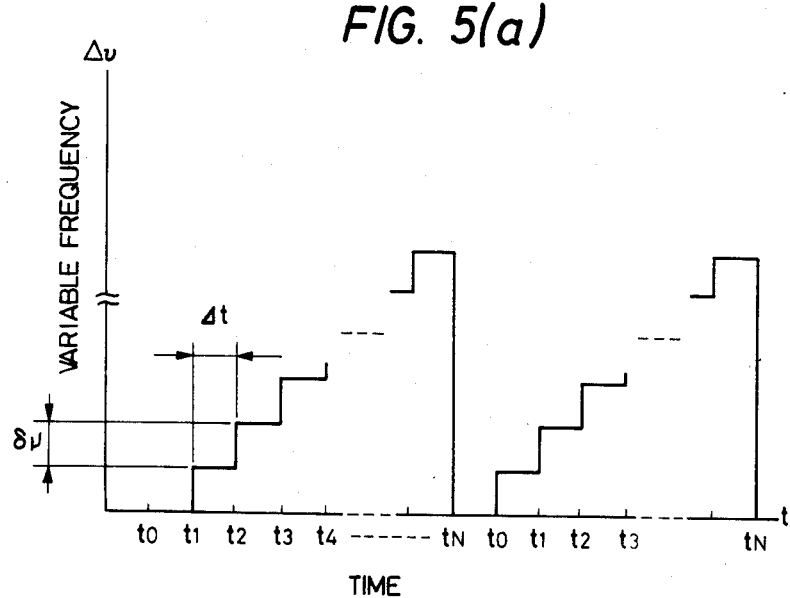
FIGS. 5(a) and 5(b) are waveform diagrams each showing an example of a variable frequency which is applied to the light diffracter of FIG. 4.
Figure 5B:
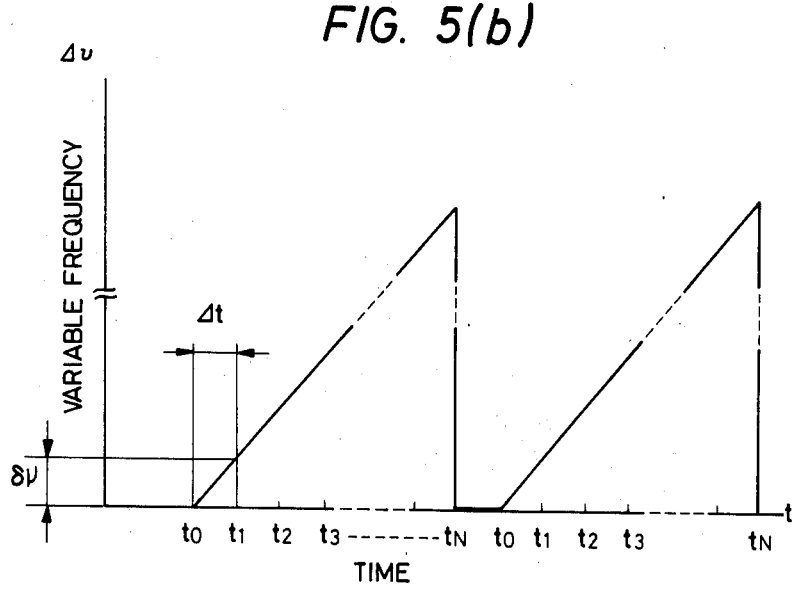

By way of example, an acousto-optic diffracter (A/O light diffracter) can be employed as the light diffracter. When the frequency $\nu$ is applied as the input signal of the A/O diffracter, the light beam is diffracted by the angle $\theta$. Now, the output from the variable frequency oscillator 16 is considered as the input to the A/O diffracter, and the waveform thereof is assumed to be a stepped waveform or a triangular waveform as shown in FIG. 5(a) or 5(b). Here, FIG. 5(a) corresponds to the recording of concentric circle tracks, and FIG. 5(b) the recording of spiral tracks. Hereinbelow, the recording of the concentric circle tracks in FIG. 5(a) will be referred to. The diffraction angle of the light beam is given by:

$$\theta(t) = \{\nu_0 + \Delta\nu(t)\} \cdot \alpha$$
$$\alpha = \lambda/V_s \ldots (4)$$

where $\nu_0$ denotes the base frequency, and $\Delta\nu(t)$ the variable frequency. Further, $\lambda$ denotes the wavelength of the laser, and $V_s$ the ultrasonic velocity. Thus, the two minute spots of the light spot 8 of the light beam 6 based on the variable frequency generated by the variable frequency oscillator 16 and the light spot 9 owing to the base frequency oscillator 15 are formed on the disc 10. The light spot 8 based on the variable frequency is deflected radially of the disc at intervals of fixed track pitches, e. g., 1.6 μm as will be described later, by varying the frequency of the variable frequency oscillator 16, and is used for recording information. On the other hand, the light spot 9 based on the base frequency does not move on the disc surface even when the frequency of the oscillator 16 has been varied. Therefore, the light spot 9 of the light beam 7 based on the base frequency is used for tracking the reference guide tracks $11^0$ already recorded on the disc 10, at all times. Since the light spot 9 of the light beam 7 based on the base frequency is used in a "read" mode and the light spot 8 of the light beam 6 based on the variable frequency is used in a "write" mode, the laser intensity of the light spot 8 needs to be sufficiently higher than that of the light spot 9. This can be realized by making the output amplitude of the variable frequency oscillator 16 greater than that of the base frequency oscillator 15. The reflected light of the light spot 9 of the light beam 7 from the reference guide track $11^0$ or $n^0$ is received by a photodetector 13, and a tracking error signal 20 can be obtained from a tracking servo circuit 14. This tracking control method is known from the official gazettes of Japanese Laid-open patent application No. 49-60702 and Japanese patent application publication No. 56-30610. The tracking error signal 20 is applied to a driver circuit 21 so as to drive the actuator 22 mounted on the lens 5 by way of example and to drive the lens 5. Then, the light spot 9 of the light beam 7 based on the base frequency tracks the reference guide track $11^0$.

The output of the photodetector 13 is also supplied to a processing circuit 35 to read the address information and the synchronizing signals recorded on the reference guide track, and the read data items are used for controlling the signal source 1 and the variable frequency oscillator 16. Further, if necessary, they are used for the rotational control of a motor 36 for rotating the record carrier 10 of FIG. 2 in case of using this record carrier by way of example.

On this occasion, the positions $P^0(t)$ and $P(t)$ of the light spot 9 of the base frequency and the light spot 8 of the variable frequency on the disc surface are respectively expressed by the following equations: $P^0(t) = \alpha(t)$ ... (5)

$$P(t) = \alpha \cdot f \cdot \Delta \nu + \alpha(t) \quad (6)$$

where $\alpha(t)$ corresponds to the tracking error signal ascribable to a disturbance, the eccentricity of the disc, etc. or the voltage fluctuation of the regulated voltage source 25, and f corresponds to the focal distance of the objective lens 5.

There will now be explained the signal $\Delta\nu(t)$ in the case of recording signals along the tracks $11^1$, $11^2$, $11^3$, ... on the disc 10 anew as the tracking state is held.

The difference of Eqs. (5) and (6) becomes:

$$P(t) - P^0(t) = \alpha \cdot f \cdot \Delta\nu(t) \ldots \quad \ldots (7)$$

That is, the interval between the light spots 9 and 8 is held constant without being affected by the eccentricity error of the disc or the voltage fluctuation of the regulated voltage source 25, $\delta(t)$. The above explanation will be concretely indicated below. Now, in order to move the light spot 8 of the diffracted wave 6 of the variable frequency by 1 μm when the focal distance of the objective lens 5 is assumed f=4 mm, $$4 \text{ mm} \times \Delta\theta = 1 \text{ μm}$$

$$\therefore \Delta\theta = 0.25 \text{ m radian} = 2.5 \times 10^{-4} \text{ radian}$$

Accordingly, the light beam of the diffracted wave 6 of the variable frequency needs to be deflected by 0.25 m radian.

Letting $\lambda$ denote the wavelength of the light beam and $V_s$ the velocity of the ultrasonic wave, the variation $\Delta\nu_s$ of the frequency in the A/0 diffracter is given by the following equation. Herein, tellurium oxide TeO$_2$ is used for the A/0 diffracter.

$$\Delta\nu_s = \Delta\theta \cdot \frac{V_s}{\lambda}$$

where
$\Delta\theta = 2.5 \times 10^{-4}$ radian
$\lambda = 0.8 \times 10^{-4}$ mm
Substituting $V_s = 0.65 \times 10^6$ mm/sec, $\Delta\nu_s = 0.2$ MHz holds. That is, the frequency variation of 0.2 MHz is required for moving the light spot 8 of the diffracted wave 6 of the variable frequency on the disc surface by 1 μm. In case of using lead molybdate, the ultrasonic velocity is $V_s = 3.6 \times 10^6$ mm/sec, and the frequency variation becomes $\Delta\nu_s = 1$ MHz.

Accordingly, in order to set the interval between the light spots 8 and 9 at integral times of the track pitch of 1.6 μm, namely, at $1.6 \times n$ (n=1, 2, ... N) μm by way of example, the variable frequency of the oscillator 16 may be varied by $$\delta\nu = \nu - \nu' = 0.3 \text{ MHz} (=0.2 \times 1.6) \quad \ldots (8)$$

every revolution of the disc (every time interval $\Delta t$) in FIGS. 3 and 5(a). When the number of tracks to be added-on is assumed 100 by way of example, the maximum value of $\Delta\nu(t)$ becomes $$max\Delta\nu = 30 \text{ MHz} (=0.3 \times 100)$$

in accordance with Eq. (8). Usually 50 MHz can be satisfactorily achieved as $\Delta\nu$, so that the 100 recording tracks corresponding to 30 MHz can be sufficiently realized. Accordingly, the variable frequency of the oscillator 16 is varied by the frequency corresponding to the track pitch of 1.6 μm each time the disc performs one revolution, and the lens actuator is driven while the tracking error signal for always tracking the reference guide track is detected by the use of the light spot 9 based on the base frequency. As a result, the light spot 9 based on the base frequency tracks the reference guide track at all times. Meantime, the light beam 6 based on the variable frequency for recording data is deflected in correspondence with the track pitch of 1.6 μm per revolution of the disc, and the data items are recorded by the light spot 8 while the fixed track pitches are held at all times.

In the embodiment, the tracking control has been explained as being performed in such a way that the objective lens 5 is moved by applying the tracking error signal 20 to the driver circuit 21 and thus driving the actuator 22. The tracking control, however, may well be performed in such a way that an adder 28-2 is provided on the output side of the regulated voltage source 25 as shown by dotted lines in FIG. 3 and that the frequency to be applied to the light diffracter 4 is controlled according to the tracking error signal 20 by adding the voltage from the regulated voltage source 25 and the tracking error signal 20.

Figure 6:
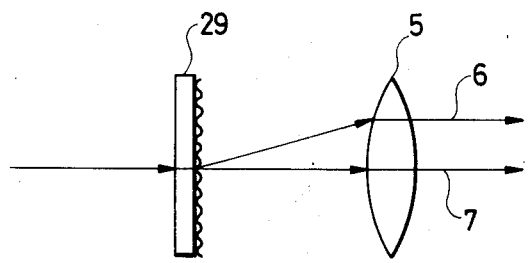
FIG. 6 is a diagram showing another example of a light diffracter for use in the present invention.

Although the example employing the A/0 diffracter as the light diffracter has been indicated here, the present invention can be realized in such a way that a rotating transmissive grating 29 as shown in FIG. 6 is employed instead of the A/0 diffracter, the rotational angle of the grating being changed as illustrated in FIG. 5(a) or 5(b). In this case, the axis of ordinates $\Delta\nu$ in FIG. 5(a) or 5(b) corresponds to the rotational angle.

Although the light beam for tracking and the light beam for writing or reading data have been prepared from the single light beam by applying the signals of the different frequencies to the A/0 light difracter 4, light beams emitted from separate light sources may well be employed. Such an example is shown in FIG. 7.

Figure 7:
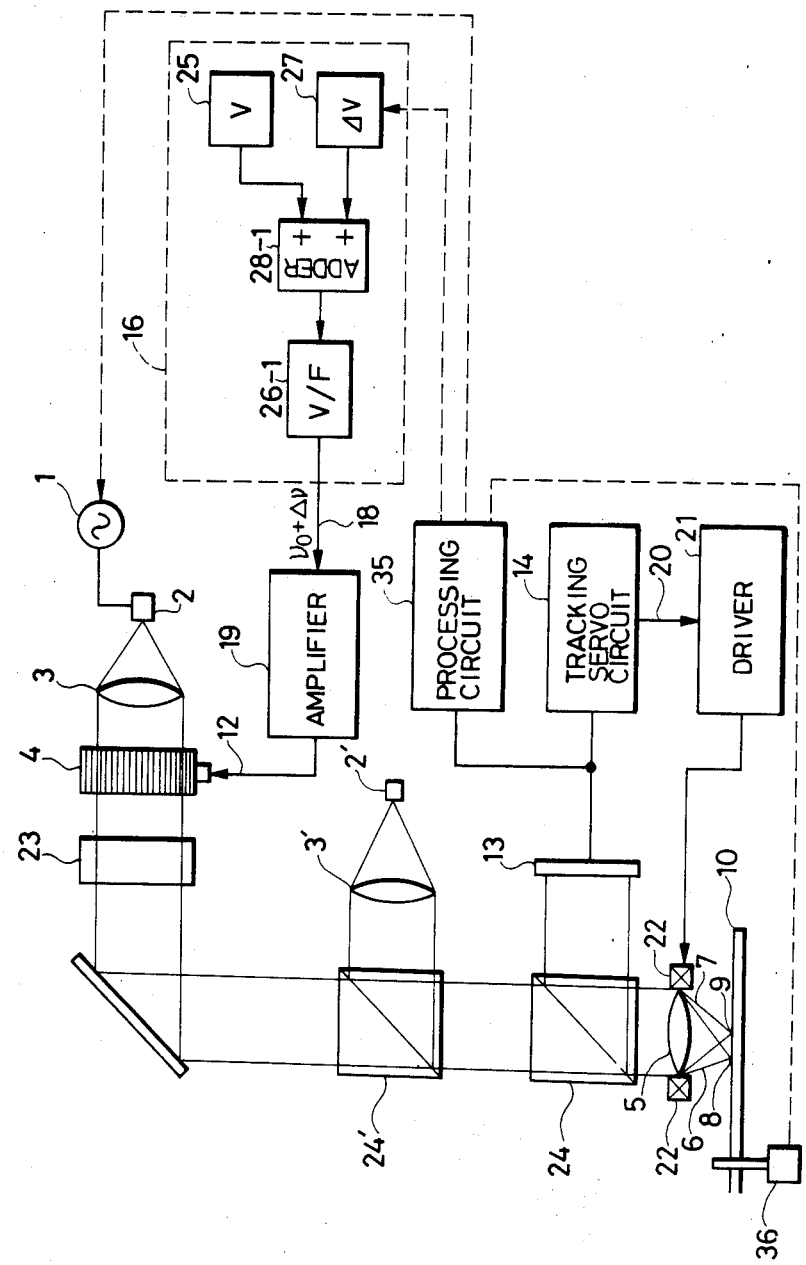
FIG. 7 is a block diagram of a second example of the recording/playback apparatus according to the present invention.

Referring to FIG. 7, a semiconductor laser capable of emitting high power is used as a light source 2 which is used for recording and playing back data. As in the embodiment of FIG. 3, a modulated light beam from the light source 2 is converted by a coupling lens 3 into a parallel beam, which is turned into a convergent beam 6 via a light diffracter 4, a beam transform optical system 23 and an objective lens 5 so as to form a minute light spot 8 on the surface of a disc 10. In the present embodiment, only the variable frequency $\nu(=V_0+\Delta\nu)$ is applied to the A/O diffracter 4. A semiconductor laser of low power is used as a light source 2' for tracking. A light beam from the light source 2' is converted by a coupling lens 3' into a parallel beam, which is turned into a convergent beam 7 via a prism 24' and the objective lens 5 so as to form a minute light spot 9 on the surface of the disc 10.

The convergent beam 6 is a variable diffracted wave generated by the light diffracter 4, and the light spot 8 thereof is used for recording and playing back data.

A variable frequency oscillator 16 is composed of a regulated voltage source 25, a variable micro voltage generator 27, an adder 28-1 and a voltage-frequency converter 26-1. It is the same as in the foregoing embodiment that, by varying the frequency of the variable frequency oscillator 16, the light spot 8 based on the diffracted wave from the light diffracter 4 is deflected radially of the disc at fixed track pitches and is used for recording information. Here, the light spot 8 based on the diffracted wave from the light diffracter 4 is set so as to assume the same position as that of the tracking light spot 9 when the variable frequency is $\nu=\nu_0$. Concretely, the A/O diffracter 4 is obliquely arranged to adjust the set angle thereof.

The reflected diffracted light of the light spot 9 from a reference guide track is received by a photodetector 13, a tracking error signal 20 is obtained from a tracking servo circuit 14, the tracking error signal 20 is applied to a driver circuit 21, and an actuator 22 mounted on the lens 5 by way of example is thus driven, whereby the reference guide track is tracked.

Since, in the present embodiment, the light spots 8 and 9 are respectively prepared from the separate light sources, the light spot for tracking is constant without being subject to the modulation of information to be recorded, and hence, the tracking error signal can be stably detected.

In order to set the precision of the track pitches of tracks $11^1$, $11^2$, ... at 1.6 $\mu m \pm 2\%$, when the center frequency of the A/O diffracter 4 is assumed 60 MHz, the frequency stability of the oscillator 16 becomes:

$$\frac{0.3 \times 0.02}{60} = 1.0 \times 10^{-4}$$

That is, a frequency stability less than $10^{-4}$ is required of the variable oscillator 16.

Figure 8:
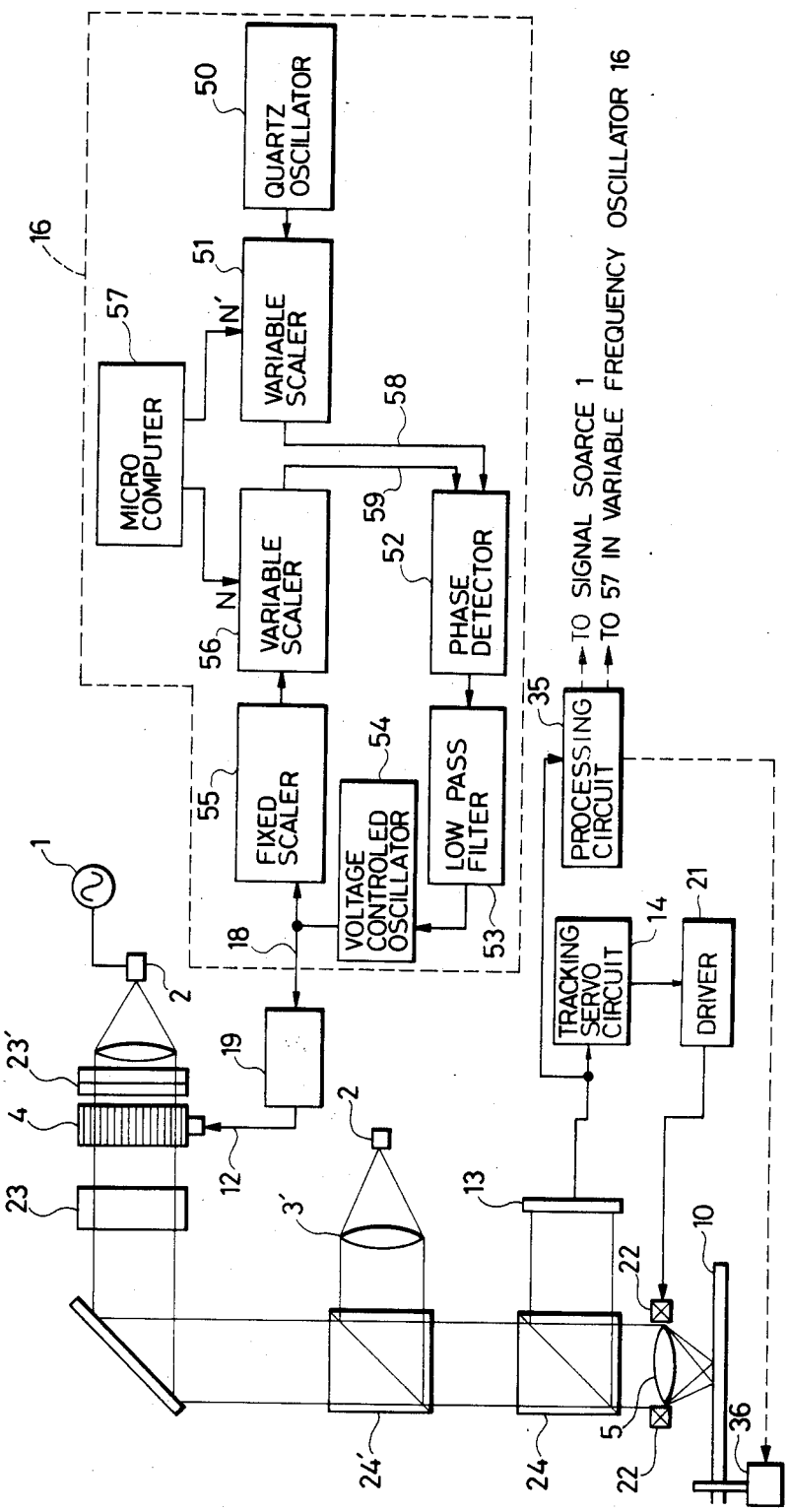
FIG. 8 is a block diagram of the recording/playback apparatus according to the present invention in which a phase locked loop is employed as a variable frequency oscillator.

Shown in FIG. 8 is one embodiment according to which, as the A/O diffracter 4 is driven at high precision in this manner, the tracks $11^1$, $11^2$, ... are recorded at the pitch precision of 1.6 $\mu m \pm 2\%$ by the recording light spot 8. Referring to FIG. 8, an oscillator 16 is composed of a single quartz oscillator for the base frequency 50, a variable scaler (N') 51, a variable scaler (N) 56, a fixed scaler (n) 55, a phase detector (P/D) 52, a low-pass filter (LPF) 53, a voltage-controlled oscillator (VCO) 54, and a microcomputer 57 for controlling the variable scalers 51, 56. An output 18 from the voltage-controlled oscillator 54 is applied to an A/O diffracter driver 19. In order to cause the oscillator 16 to oscillate, for example, 100 frequencies from 60 MHz to 90 MHz at steps of 0.3 MHz with a precision of $10^{-4}$, the base frequency of the quartz oscillator 50, for example, $f_0=4.5$ MHz $\pm 2$ pPM is divided into $1/N'$ by the scaler (N') 51, and a signal 58 at the frequency $f_0/N'$ is applied to the phase detector (P/D) 52. The phase detector (P/D) 52, the low-pass filter (LPF) 53, the voltage-controlled oscillator (VCO) 54, the scaler (n) 55, and the variable scaler (N) 56 constitute a phase locked loop (PLL). A servo system operates so that the frequency of the output 59 of the scaler (N) 56 may equalize to the output 58 of the scaler (N') 51. More specifically, the output 18 of the VCO 54 is divided into $1/n$ by the fixed scaler 55, the output of which is further divided into $1/N$ by the variable scaler 56. The phase difference between the resulting output and the output of the variable scaler 51 is detected by the phase detector 52 so as to generate a control voltage corresponding to the phase difference. The high frequency components of the control voltage are removed by the LPF 53, and the resulting output is applied to the VCO 54 as an oscillation frequency control signal. As a result, a signal at a frequency $(f_0/N') \cdot N \cdot n$ is obtained at the output 18 of the VCO 54. The output 18 of the VCO 54 can be variously changed by properly changing the relationship between N and N'. By program-controlling them by means of the microcomputer 57, a waveform as shown in FIG. 5(a), for example, a waveform which changes from 60 MHz to 90 MHz at steps of 0.3 MHz can be stably produced at high precision.

Figure 9:
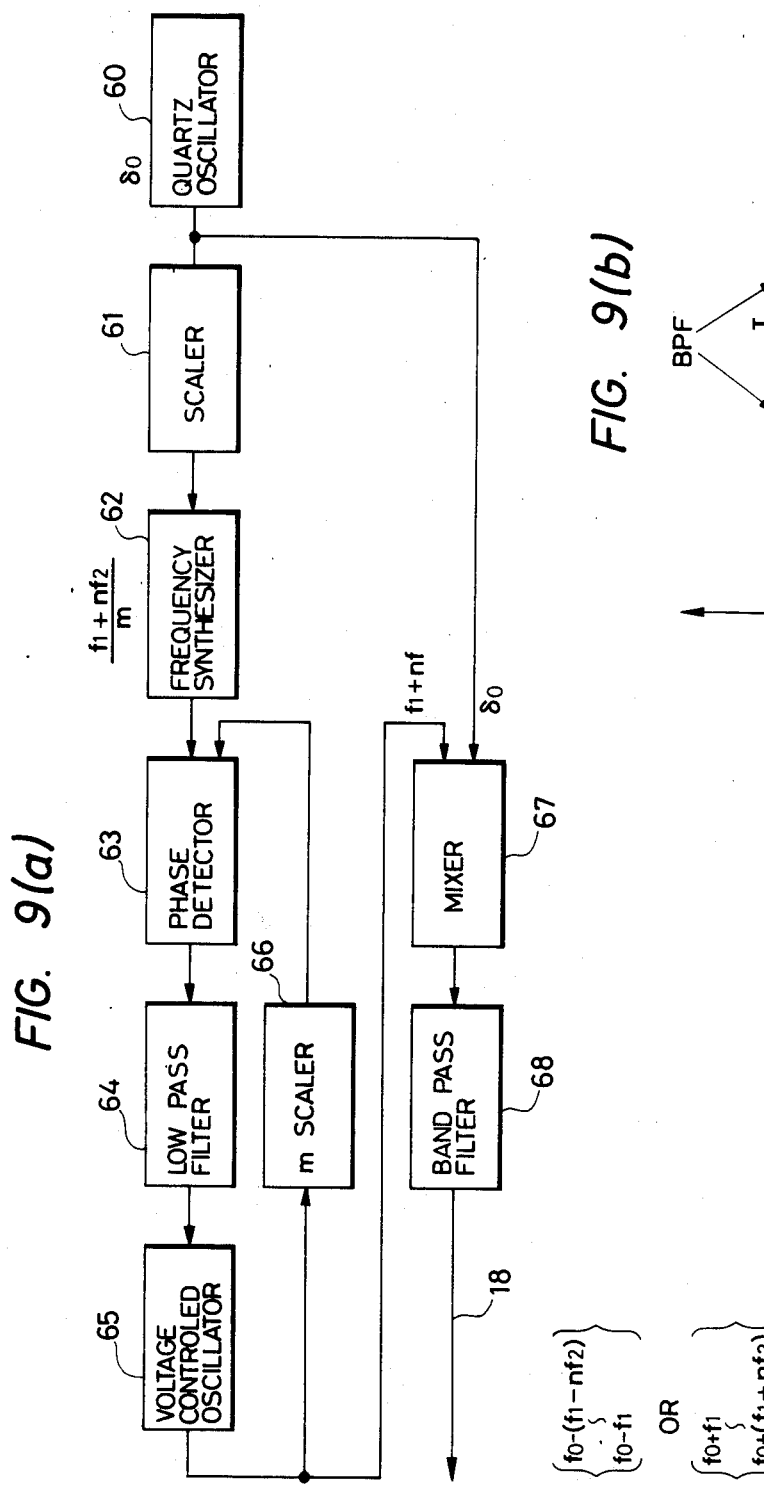
FIGS. 9(a) and 9(b) are diagrams showing another example of a variable frequency oscillator for use in the present invention.

Another embodiment of the oscillator 16 in FIG. 8 is shown in FIG. 9. Referring to FIG. 9, the oscillator 16 is composed of a quartz oscillator 60 for oscillating the base frequency, a scaler 61, a frequency synthesizer 62, a phase detector (P/D) 63, a low-pass filter (LPF) 64, a voltage-controlled oscillator (VCO) 65, an m scaler 66, a mixer 67, and a band-pass filter 68. The output 18 of the band-pass filter is applied to the A/O diffracter driver 19.

In order to cause the oscillator 60 to generate, for example, 100 frequencies from 60 MHz to 90 MHz at steps of 0.3 MHz with a precision of $10^{-6}$, the oscillator 60 is caused to oscillate at the precision of $10^{-6}$ by the use of quartz, the oscillation frequency is divided by means of the scaler 61 into a frequency which can be readily processed by logic devices, and a desired frequency is thereafter produced by the frequency synthesizer 62. A sinusoidal wave of $(f_1+n\ f_2)$ to enter the mixer (MIX) 67 is generated by a PLL which is composed of the phase detector (P/D) 63, the low-pass filter (LPF) 64, the voltage-controlled oscillator (VCO) 65 and the m scaler 66. In the mixer 67, $f_0$ and $f_1+n\ f_2$ are mixed to generate $f_0 \pm (f_1+n\ f_2)$ spectrum components, either side band component of which is derived by the band-pass filter 68 so as to obtain the A/O diffracter control signal 18. Assuming now $f_0=100$ MHz, $f_1=10$ MHz and $f_2=0.3$ MHz, the signal which changes from 60 MHz to 90 MHz at the steps of 0.3 MHz can be stably produced.

Figure 10:
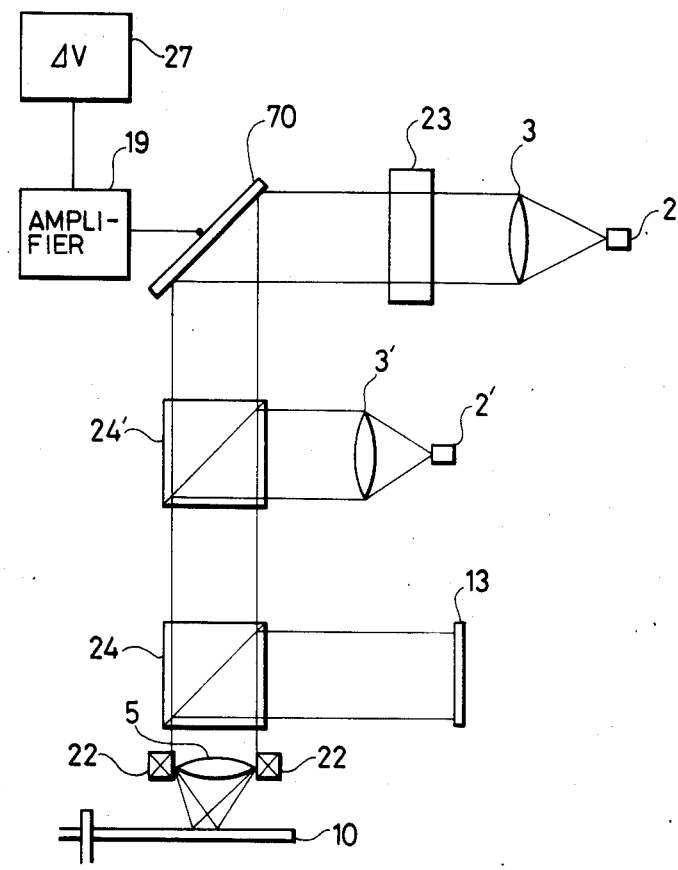
FIG. 10 is an arrangement diagram of the recording/playback apparatus according to the present invention in which a piezo-mirror is employed as a light diffracter.

Although the embodiment employing the A/O diffracter as the light diffracter has been indicated here, the light diffracter can be realized in such a way that a rotating piezo-mirror 70 as shown in FIG. 10 is employed instead of the A/O diffracter, the rotational angle of the mirror being changed as illustrated in FIG. 5(a) or 5(b). In this case, the axis of ordinates $\Delta\nu$ in FIG. 5(a) or 5(b) corresponds to the rotational angle.

Figure 11:
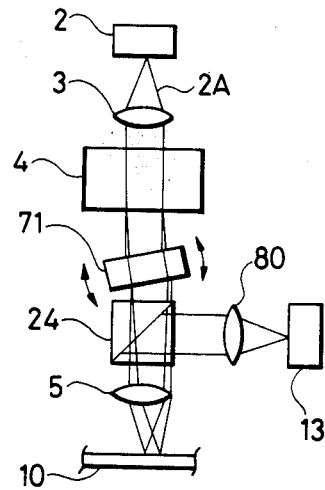
FIG. 11 is an arrangement diagram of the recording/playback apparatus according to the present invention in which a movable transparent member is employed as tracking means.
Figure 12:
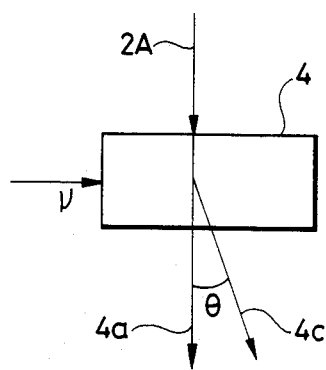
FIG. 12 is a diagram for explaining the operation of a light diffracter which is used in the apparatus of FIG. 11.
Figure 13:
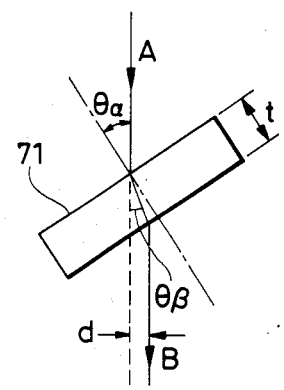
FIG. 13 is a diagram for explaining the operation of a beam shifter.
Figure 14:
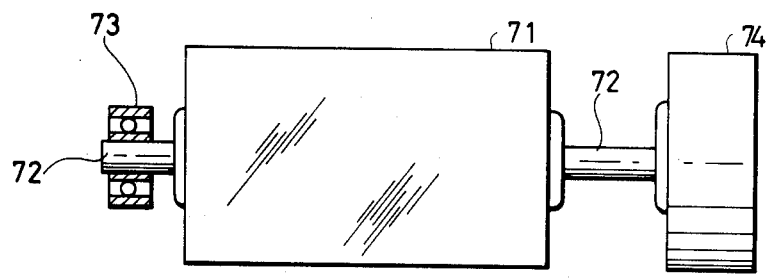
FIG. 14 is a side view showing the driving mechanism of the beam shifter.

In the foregoing, the tracking control has been performed in such a way that the light diffracter 4 or the actuator 22 mounted on the objective lens 5 is driven by the tracking error signal, it can also be performed with optical path modification means such as a movable transparent or reflective member. Such examples will be described with reference to FIGS. 11 to 14. FIG. 11 is a schematic arrangement diagram of a recording/playback apparatus, FIG. 12 is an explanatory diagram illustrative of the operation of an A/O diffracter for use in the apparatus, FIG. 13 is an explanatory diagram illustrative of the operation of a beam shifter, and FIG. 14 is a side view showing the drive mechanism of the beam shifter.

Light emitted from a semiconductor laser 2 is collimated into a parallel beam by an optical system such as lens 3, and the parallel beam enters a light diffracter (for example, A/O diffracter) 4. As illustrated in FIG. 12, one sort of ultrasonic wave at a frequency $\nu$ is applied to the A/O light diffracter 4. In consequence, the incident light 2A is split into the two beams of zero-order light 4a and first-order light 4c which inclines by an angle $\theta$ or so with respect to the former.

The parallel beams of the zero-order light 4a and the first-order light 4c enter a beam shifter 71. As shown in FIG. 13, the beam shifter 71 is a transparent glass plate which has a thickness t and a refractive index n. If necessary, the entrance surface and exit surface of the glass plate are subjected to anti-reflection processing. In a case where the beam shifter 71 inclines by an angle $\theta\alpha$ relative to an optic axis, incident light A permeates through the beam shifter 71 thereby to be refracted and emitted to a position B. That is, the incident light A is shifted by d. The shift (deviation) magnitude d is evaluated by the following equation in accordance with the law of the refraction of light:

$$d = t \cdot \frac{\sin(\theta_\alpha - \theta_\beta)}{\cos \theta_\beta}$$

Accordingly, the beam shift magnitude d concerning the inclination angle of the beam shifter 71 is given by:

$$d = t \cdot \sin \theta_\alpha \left( 1 - \frac{\cos \theta_\alpha}{n\sqrt{1 - \sin^2 \theta_\alpha}} \right)$$

Assuming by way of example that the thickness t is 5 mm, that the refractive index n of glass of which the beam shifter 71 is made is 1.5 and that the inclination angle $\theta_\alpha$ is 30 degrees, the beam shift magnitude d becomes 83 $\mu$m. The beam shift magnitude d can be adjusted by varying the inclination angle $\theta_\alpha$ of the beam shifter 71.

As shown in FIG. 14, turning shafts 72, 72 are respectively connected to both the ends of the beam shifter 71 in the longitudinal direction thereof. One turning shaft 72 is journaled in a bearing 73, while the other turning shaft 72 is coupled to the rotor (not shown) of a pulse motor 74. Accordingly, the inclination angle of the beam shifter 71 can be adjusted stepwise by energizing the pulse motor 74.

The zero-order light 4a and first-order light 4c stated before permeate through the beam shifter 71 thereby to have the positions of the beams shifted simultaneously, and then pass through a semitransparent mirror or beam splitter prism 24, to form two light spots on a disc 10 via an objective lens 5. The zero-order light 4a is for tracking and therefore forms the light spot on the reference guide track $11^0$ or $n^0$ of the optical disc 10, while the first-order light 4c is for writing or reading and therefore forms the light spot on the data track. Light reflected by the surface of the optical disc 10 has its optical path bent by the semitransparent mirror or beam splitter prism 24, and is focused on the light receiving face of a photodetector 13 by an optical system 80. Tracking information obtained with the photodetector 13 is applied as a feedback signal to the pulse motor 74 through a control portion (not shown), and is converted into the rotational angle of the beam shifter 71. In case of shifting the tracking light spot of the zero-order light 4a onto the adjacent reference guide track, it can be immediately moved by altering the inclination angle d of the beam shifter 71. On this occasion, the writing or reading light spot of the first-order light 4c can be simultaneously moved onto the data track $11^1$, $11^2$, . . . or the like of the next recording area ⓒ.

Figure 15:
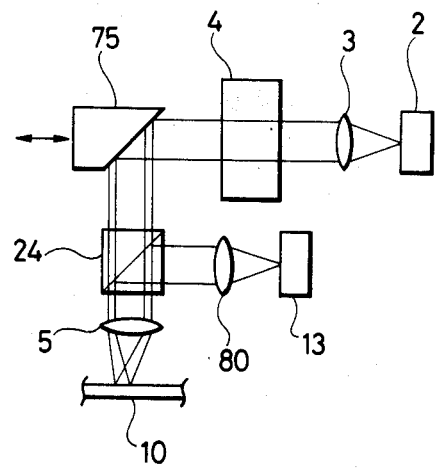
FIG. 15 is an arrangement diagram of the recording/playback apparatus according to the present invention in which a movable reflective member is employed as tracking means.

FIG. 15 is a schematic arrangement diagram of a recording/playback apparatus according to another embodiment of the present invention. The main point of this embodiment differing from the embodiment of FIG. 11 is that a reflector 75 is used in lieu of the beam shifter 71 and is advanced rectilinearly or turned every predetermined movement value. More specifically, the zero-order light 4a and the first-order light 4c having emerged from the A/O light diffracter 4 are reflected by the reflector 75 and are passed through the semitransparent mirror or beam splitter prism 24 as well as the objective lens 5. When, as described above, the reflector 75 is advanced rectilinearly or turned to change its position, the incident positions of the zero-order light 4a and first-order light 4c upon the objective lens 5 change, and the tracking in the next area is performed on the optical disc 10.

For example, a linear pulse motor, an electromagnetic solenoid or a torsion vibrator is employed as drive means for rectilinearly advancing or turning the reflector 75.

In the embodiment of FIG. 11 or the embodiment of FIG. 15, when the frequency $\nu$ to be applied to the A/O light diffracter 4 is controlled to $f_1 \pm \Delta f_1$ in correspondence with the particular data track position as illustrated in FIG. 5(a) or 5(b), the light spot can be set at a desired data track position.

The utilization efficiency of light is favorable in the case where, as in these embodiments, the A/O light diffracter is used as beam division means for dividing one parallel beam into a plurality of beams, thereby to divide the parallel beam into zero-order light and first-order light, so as to employ the zero-order light for tracking and the diffracted first-order light for writing or reading.

What is claimed is:

1. An apparatus comprising:
   a record carrier having a circular disc-shaped substrate provided thereon with a recording layer capable of optically writing information therein and in which a plurality of circumferential reference tracks extending in a rotating direction of said record carrier are disposed at radial intervals, each of said reference tracks being constructed into an optically detectable structure so as to function as an optical guide for enabling recording of information at least between adjacent reference tracks;

an objective lens for condensing first and second light beans and for focusing said first and second light beams on said recording layer of said record carrier respectively;

optical detection means for detecting an intensity of said first light beam from said recording layer;

means for deriving from the output of said optical detection means a tracking signal for controlling impingement positions of both said first and second light beams in a direction traversing the track direction;

tracking means for causing said first light beam to follow one of said reference tracks in response to the tracking signal;

light diffraction means for moving said second light beam on said recording layer of said record carrier in the radial direction thereof, said light diffraction means including an acousto-optic diffracter, first oscillation means for generating an output signal corresponding to a first frequency which varies by a predetermined frequency corresponding to a predetermined pitch each time said record carrier performs one revolution, and driving means for supplying the output signal of said first oscillation means to said acousto-optic diffracter so that said acousto-optic diffracter moves said second light beam to vary the interval between said first and second light beams on said recording layer by said predetermined pitch each time said record carrier performs one revolution while said first light beam follows one of said reference tracks; and means to modulate the intensity of said second light beam in response to information to be recorded so that said second light beam writes information as information tracks between said reference tracks while one of said reference tracks is followed by said first light beam, said information tracks having radial intervals of said predetermined pitch therebetween.

2. An apparatus according to claim 1, wherein said first oscillation means includes a phase locked loop circuit.

3. An apparatus comprising:

a record carrier having a circular disc-shaped substrate provided thereon with a recording layer capable of optically writing information therein and in which a plurality of circumferential reference tracks extending in a rotating direction of said record carrier are disposed at radial intervals, each of said reference tracks being constructed into an optically detectable structure so as to function as an optical guide for enabling recording of information at least between adjacent reference tracks;

an objective lens for condensing first and second light beams and for focusing said first and second light beams on said recording layer of said record carrier respectively;

optical detection means for detecting an intensity of said first light beam from said recording layer;

means for deriving from the output of said optical detection means a tracking signal for controlling impingement positions of both said first and second light beams in a direction traversing the track direction;

tracking means for causing said first light beam to follow one of said reference tracks in response to the tracking signal;

light diffraction mens for moving said second light beam on said recording layer of said record carrier in the radial direction thereof, said light diffraction means including an acousto-optic diffracter, first oscillation means for generating an output signal corresponding to a first frequency which varies by a predetermined frequency corresponding to a predetermined pitch each time said record carrier performs one revolution, and driving means for supplying the output signal of said first oscillation means to said acousto-optic diffracter so that said acousto-optic diffracter moves said second light beam to vary the interval between said first and second light beams on said recording layer by said predetermined pitch each time said record carrier performs one revolution while said first light beam follows one of said reference tracks, said first oscillation means including a quartz oscillator, a first scaler for dividing an output frequency of said quartz oscillator, a phase locked loop, and a control circuit for controlling said first scaler and a third scaler of said phase locked loop, said phase locked loop including a voltage-controlled oscillator for generating an output signal of a frequency corresponding to a control voltage, a second scaler for dividing the output frequency of said voltage-controlled oscillator, said third scaler for dividing a frequency of an output of said second scaler, a phase detector for detecting a phase difference between an output of said first scaler and an output of said third scaler and for generating the control voltage corresponding to the phase difference, and a low-pass filter for applying the output of said phase detector to said voltage-controlled oscillator after removing high frequency components thereof, the output of said voltage-controlled oscillator being utilized as the output of said first oscillation means; and means to modulate the intensity of said second light beam in response to information to be recorded so that said second light beam writes information as information tracks between said reference tracks while one of said reference tracks is followed by said first light beam, said information tracks having radial intervals of said predetermined pitch therebetween.

4. An apparatus according to claim 3, wherein a single light source is provided and a light beam from said light source is caused to enter said acousto-optic diffracter, said light diffraction means further including second oscillation means for generating a signal corresponding to a predetermined second frequency different from said first frequency, and a first adder for adding the outputs of said first and second oscillation means, an output of said first adder being supplied to said acousto-optic diffracter by said driving means.

5. An apparatus according to claim 3, wherein a single light source is provided and a light beam from said light source is caused to enter said acousto-optic diffracter, said acoustic-optic diffracter emitting zero-order light and first-order light utilized respectively as said first and second light beams.

6. An apparatus according to claim 3, wherein two light sources are provided and a light beam from one of said light soures is caused to enter said acousto-optic diffractor which emits first-order light for utilization as said second light beam, a light beam from the other of said light source being utilized as said first light beam, an optical device disposed in an optical path between said acousto-optic diffracter and said objective lens for syntheisizing said first and second light beams, and light beams from said optical device being condensed on said recording layer of said record carrier by said objective lens.

7. An apparatus according to claim 4, wherein said second oscillation means includes a second adder for adding the tracking signal to the signal corresponding to the second frequency, said second oscillation means outputting the added signal, and said tracking means incorporating said acousto-optic diffracter therein.

8. An apparatus according to claim 3, wherein said record carrier is divided into sectors of fixed length, and means are provided to control a rotational frequency of sasid record carrier in accordance with the reference track followed by said first light beam.

9. An apparatus according to claim 3, wherein a movable type optical path alteration means is disposed in an optical path between said acousto-optic diffracter and said objective lens for moving said first light beam from one of said reference tracks to another of said reference tracks while the interval between said first and second light beams is maintained.

10. An apparatus according t claim 9, wherein said movable type optical path alteration means includes a transparent member, and said first and second light beams are moved on said recording layer of said record carrier by movement of said transparent member.

11. An apparatus according to claim 9, wherein said movable type optical path alteration means includes a reflective member, and said first asnd second light beams are moved on said recording layer of said record carrier by movement of said reflective member.

12. An apparatus comprising:
a record carrier having a circular disc-shaped substrate provided thereon with a recording layer capable of optically writing information therein and in which a plurality of circumferential reference tracks extending in a rotating direction of said record carrier are disposed at radial intervals, each of said reference tracks being constructed into an optically detectable structure so as to function as an optical guide for enabling recording of information at least between adjacent reference tracks;
an objective lens for condensing first and second light beams and for focusing said first and second light beams on said recording layer of said record carrier respectively;
optical detection means for detecting an intensity of said first light beam from said recording layer;
means for deriving from the output of said optical detection means a tracking signal for controlling impingement positions of both said first and second light beams in a direction traversing the track direction;
tracking means for causing said first light beam to follow one of said reference tracks in response to the tracking signal;
light diffraction means for moving said second light beam on said recording layer of said second carrier in the radial direction thereof, said light diffraction means including an acousto-optic diffracter, first oscillation means for generating an output signal corresponding to a first frequency which varies by a predetermined frequency corresponding to a predetermined pitch each time said record carrier performs one revolution, and driving means or supplying the output signal of said first oscillation eans to said acousto-optic diffracter so that said cousto-optic diffracter moves said second light beam to vary the interval between said first and second light beams on said recording layer by said predetermined pitch each time said record carrier performs one revolution while said first light beam follows one of said reference tracks, said first oscillation means including a quartz oscillator, a first scaler for dividing an output frequency of said quartz oscillator, a frequency synthesizer for producing a signal of a desired frequency on the basis of an output of said first scaler, a phase locked loop, a mixer for mixing an output of a voltage-controlled oscillator and the output of said quartz oscillator, and a band-pass filter for deriving a side band component of an output of said mixer, said phase locked loop including the voltage-controlled oscillator for generating a signal of a frequency corresponding to a control voltage, a second scaler for dividing the output frequency of said voltage-controlled oscillator, a phase detector for detecting a phase difference between the output of said frequency synthesizer and an output of said second scaler and for generating the control voltage corresponding to the phase difference, and a low-pass filter for applying the output of said phase detector to said voltage-controlled oscillator after removing high frequency components thereof, the output of said band-pass filter being utilized as the output of said first oscillation means; and
means to modulate the intensity of said second light beam in response to information to be recorded so that said second light beam writes information as information tracks between said reference tracks while one of said reference tracks is followed by said first light beam, said information tracks having radial intervals of said predetermined pitch therebetween.

13. An apparatus according to claim 12, wherein single light source is provided and a light beam from said light source is caused to enter said acousto-optic diffracter, said light diffraction means further including second oscillation means for generating a signal corresponding to a predetermined second frequency difference from said first frequency, and a first adder for adding the outputs of said first and second oscillation means, an output of said first adder being supplied to said acousto-optical diffracter by said driving means.

14. An apparatus according to claim 12, wherein a single light source is provided and a light beam from said light source is caused to enter said acousto-optic diffracter, said acousto-optic diffracter emitting zero-order light and a first order light utilized respectively as said first a second light beams.

15. An apparatus according to claim 12, wherein two light sources are provided and a light beam from one of said light sources is caused to enter said acousto-optic diffracter which emits first-order light for utilization as said second light beam, a light beam from the other of said light source being utilized as said first light beam, an optical device disposed in an optical path between said acousto-optic diffracter and said objective lens for synthesizing said first and second light beam, and light beams from said optical device being condensed on said recording layer of said record carrier by said objective lens.

16. An apparatus according to claim 13, wherein said second oscillation means includes a second adder for adding the tracking signal to the signal corresponding to the second frequency, said second oscillation means outputting the added signal, and said tracking means incorporating said acousto-optic diffracter therein.

17. An apparatus according to claim 12, wherein said record carrier is divided into sectors of fixed length, and means are provided to control a rotational frequency of said record carrier in accordance with the reference track followed by said first light beam.

18. An apparatus according to claim 12, wherein a movable type optical path alteration means is disposed in an optical path between said acousto-optic diffracter and said objective lens for moving said first light beam from one of said reference tracks to another of said reference tracks while the interval between said first and second light beam is maintained.

19. An apparatus according to claim 18, wherein said movable type optical path alteration means includes a transparent member, and said first and second light beams are moved on said recording layer of said record carrier by movement of said transparent member.

20. An apparatus according to claim 18, wherein said movable type optical path alteration means includes a reflective member, a said first and second light beams are moved on said recording layer of said record carrier by movement of said reflective member.

* * * * *